W. ANTHONY.
ELECTRICAL MEASURING INSTRUMENT.
APPLICATION FILED JAN. 20, 1916.
1,223,306.
Patented Apr. 17, 1917.
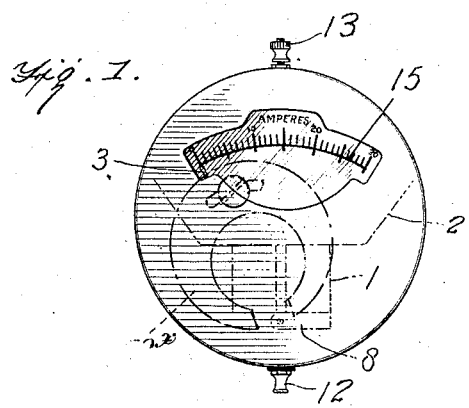
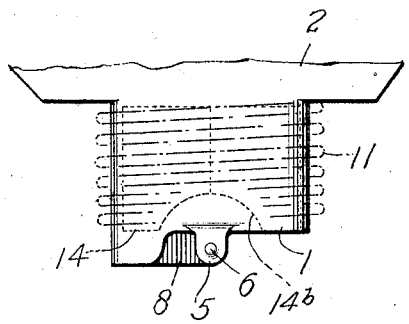
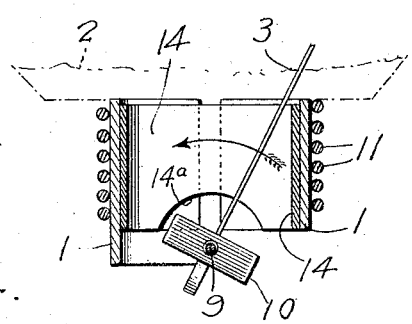
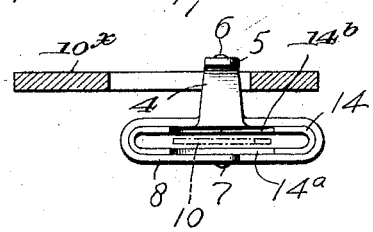
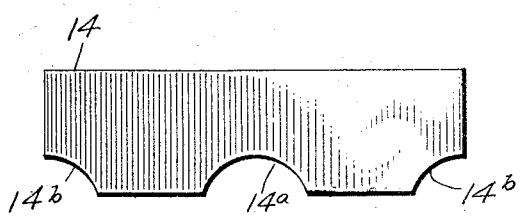
WITNESSES:
INVENTOR
WILLIAM ANTHONY,
BY
ATTORNEYS

UNITED STATES PATENT OFFICE.

WILLIAM ANTHONY, OF CLYDE, OHIO.

ELECTRICAL MEASURING INSTRUMENT.

1,223,306.  Specification of Letters Patent.  Patented Apr. 17, 1917.

Application filed January 20, 1916. Serial No. 73,192.

*To all whom it may concern:*

Be it known that I, WILLIAM ANTHONY, a citizen of the United States, and a resident of Clyde, in the county of Sandusky and State of Ohio, have invented a certain new and useful Improvement in Electrical Measuring Instruments, of which the following is a specification.

My invention relates to improvements in electrical measuring instruments, especially pocket voltmeters and ammeters, and it consists in the constructions, combinations, and arrangements herein described and claimed.

An object of my invention is to provide an improved measuring instrument over that set forth in a prior application, Serial Number 16,648, filed March 24, 1915, in which a needle is acted on by a coil, the deflection of the needle being proportional to the current passing through the coil. The present application relates more particularly to the strengthening of the field of force as well as to the provision of means whereby the pointer may move along a scale marked off with uniform distances, the movement of the pointer being the same for each volt or ampere registered regardless of the position of the pointer with respect to the ends of the scale. This is accomplished by providing a soft iron core inside the coil having a cut-away portion which distributes the lines of force to give uniform movement to the needle, as stated, but which serves to strengthen the coil.

My invention is illustrated in the accompanying drawings forming part of this application, in which:

Figure 1 is a front view of the device.

Fig. 2 is an enlarged detail view of a portion of the device.

Fig. 3 is a sectional view through the part shown in Fig. 2.

Fig. 4 is an end view of the parts of the device shown in Figs. 2 and 3, and

Fig. 5 is a view of a blank from which the soft iron core is cut.

In carrying out my invention, I provide a spool 1 which is formed by stamping portions from a brass plate 2 and bending these portions together so as to provide an oblong spool with a space in the center in which a needle 3 may move. The spool is provided with a struck-up portion 4 having a laterally extending end 5, this being provided with a punched or depressed portion 6 in alinement with a similar punched or depressed portion 7 of an extension 8 on the opposite side of the spool.

The needle 3 is mounted on a pivot shaft 9 whose ends are disposed in the recesses or punched out places 6 and 7 of the bearing members 5 and 8 respectively. A magnet 10 is carried by the shaft 9.

Carried by the spool 1 is a coil 11, one end of which is designed to be connected with the binding post 12, see Fig. 1, the other end being connected with a binding post 13.

The description thus far applies to the form of the device disclosed in said prior application. In addition to the parts therein mentioned, I provide a shield or core 14 of the shape shown in Fig. 4. This shield or core is preferably stamped out of a single piece of sheet metal of the shape shown in Fig. 5, there being a central semi-circular cut-away portion $14^a$ and end cut-away portions $14^b$ of such shape that when the ends of the core are brought together there will be formed a semi-circular cut-away portion similar to the portion $14^a$. The core is formed and is slipped on the inside of the spool 1 with the cut-away portions $14^a$ and $14^b$ opposite each other.

In the actual construction of the meter, a permanent magnet $10^x$ is used, which is in proximity to the magnet 10, the latter being polarized by the permanent magnet. For the purposes of this specification it will be sufficient to state that when current is sent through the coil 11 it will cause a deflection of the needle 3 owing to the action of the coil on the magnet 10, this magnet being within the field of force of the coil.

It will be apparent that the provision of the core 14 will tend to strengthen the field of force of the coil 11, because of the fact that the core provides a path for the lines of force. The main feature, however, is to provide a core having a cut-away portion $14^a$, so that the lines of force will be compelled to follow the core. The result is that as the needle is deflected and the magnet 10 swings, the amount of deflection of the needle at any point on the scale 15 (see Fig. 1) will be the same for a given increase or decrease in current. That is to say, for each ampere or volt which is indicated by the scale 15, the same increase of current must be applied to the coil. Without the core having the cut-away portion, the same increases of current will produce different deflections of the needle, so that on a scale having evenly divided parts for a given amount of current, the deflection may be one unit, while for the same amount of current, the deflection may be a unit and a quarter or a unit and a half, while the next deflection will be two units, etc. The purpose, therefore, of the cut-away portion is to provide means by which this distorted scale may be made uniform. This forms a very simple and effective method or means of overcoming or correcting the tendency of the needle to move irregularly for uniform increases or decreases of current. It permits the use of a scale having uniform and equally spaced division marks which are of more attractive appearance and are more easily read, since they are uniform. While an important object is gained by the use of the core, the additional cost is very low, as these cores may be stamped out of sheet metal very readily and are held in position frictionally, thereby dispensing with the need of screws or other retaining means.

I claim:—

1. In an electrical measuring instrument, a spool, a coil of wire wound thereon and adapted to receive an electric current, a needle or pointer mounted for movement within the spool, a magnet secured to the needle in the field of force of the coil and adapted to be moved by variations of the current in the coil, and means coöperating with the current in the coil for regulating the amount of movement of the magnet, said last named means comprising an iron core bent to conform with the interior of the spool and being held in frictional contact with the inner walls of the spool, said core having a cut-away portion adjacent to said magnet.

2. In an electrical measuring instrument, a spool, a coil of wire wound thereon and adapted to receive an electric current, a needle or pointer mounted for movement within the spool, a magnet secured to the needle in the field of force of the coil and adapted to be moved by variations of the current in the coil, means coöperating with the current in the coil for regulating the amount of movement of the magnet, said last named means comprising an iron core bent to conform with the interior of the spool and being held in frictional contact with the inner walls of the spool, said core having a pair of similar cut-away portions extending inwardly from one edge of the core in the walls of the core, said cut away portions being in close proximity to the end of the magnet.

3. In an electrical measuring instrument, an oblong spool, a coiled wire carried by said spool for conveying an electric current, a soft iron core comprising a sleeve formed from a single sheet of metal, said sleeve being inserted on the interior of the spool and being held in frictional contact therewith, a needle or pointer disposed within the interior of said core and having an axis disposed at right angles to the central axis of the core and having a pivot shaft, a magnet secured to said needle, the plane of the magnet being parallel with the central axis of the core and at right angles to said pivot shaft, said core having semicircular cut away portions extending inwardly from the edges of the core at one end thereof, the cut away portions being disposed adjacent to one end of said magnet and being symmetrically disposed with respect to the pivot of the needle.

WILLIAM ANTHONY.